(12) United States Patent
Cozzi (10) Patent No.: US 10,084,337 B1
(45) Date of Patent: Sep. 25, 2018

(54) SPILL PROOF ELECTRICAL CHARGER

(71) Applicant: Lew Electric Fittings Company, Carol Stream, IL (US)

(72) Inventor: James Cozzi, Geneva, IL (US)

(73) Assignee: Lew Electric Fittings Company, Carol Stream, IL (US)

( * ) Notice: Subject to any disclaimer, the term of this patent is extended or adjusted under 35 U.S.C. 154(b) by 0 days.

(21) Appl. No.: 15/492,816

(22) Filed: Apr. 20, 2017

(51) Int. Cl.
*H02J 7/00* (2006.01)
*H02J 7/02* (2016.01)

(52) U.S. Cl.
CPC ............ *H02J 7/025* (2013.01); *H02J 7/0052* (2013.01); *H02J 2007/0062* (2013.01)

(58) Field of Classification Search
USPC .......................................... 320/108, 113, 115
See application file for complete search history.

(56) References Cited

U.S. PATENT DOCUMENTS

| | | | | |
|---|---|---|---|---|
| 5,461,299 A * | 10/1995 | Bruni | ................... | B60L 11/182 320/108 |
| 6,756,765 B2 | 6/2004 | Bruning | | |
| 6,878,877 B1 * | 4/2005 | Cozzi | ................... | H02G 3/123 174/53 |
| 8,294,427 B2 | 10/2012 | Inoue | | |
| 9,197,094 B2 | 11/2015 | Van Wiemeersch | | |
| 9,263,910 B2 | 2/2016 | Amano | | |
| 9,300,151 B2 | 3/2016 | Chen | | |
| 9,318,915 B2 | 4/2016 | Miller | | |
| 9,419,465 B2 | 8/2016 | van Lammeren | | |
| 9,455,595 B2 | 9/2016 | Jeon | | |
| 9,461,499 B2 | 10/2016 | Ormesher | | |
| 9,490,652 B2 * | 11/2016 | Kim | ........................ | H02J 7/025 |
| 9,543,779 B2 | 1/2017 | Won | | |
| 9,548,624 B2 | 1/2017 | Wei | | |
| 9,577,467 B1 | 2/2017 | Karanikos | | |
| 2010/0194337 A1 * | 8/2010 | Opolka | .................. | H01R 13/22 320/114 |
| 2011/0006611 A1 * | 1/2011 | Baarman | ................. | H01F 38/14 307/104 |
| 2013/0057203 A1 * | 3/2013 | Jones | ...................... | H02J 50/10 320/108 |
| 2013/0320921 A1 * | 12/2013 | Muller | .................. | H02J 7/0042 320/109 |

* cited by examiner

*Primary Examiner* — Samuel Berhanu
(74) *Attorney, Agent, or Firm* — Michael P. Mazza, LLC (57) ABSTRACT

A relocatable power tap with a charging station for charging one or more electrical devices. The power tap is preferably selectively moveable through an aperture of a work surface, between depressed and upright positions. The power tap may include a top portion with a wireless charging emitter and a cover, and a lower portion for hard-wiring charging of electrical devices. The cover may fit flush and liquid-tight with the work surface when the power tap is in the depressed position. The charging station is located above the work surface in a spill-proof position, when the power tap is in the upright position.

2 Claims, 10 Drawing Sheets

| B.O.M | | | |
|---|---|---|---|
| DIE BONDING TECHNIQUE: LEAD-FREE | | | |
| NO:BEE809_V11 REV:2.0.0 | | | |
| 序号 | NAME | SPECIFICATION | PACKAGING INFO |
| 1 | USB | *DEU-02 | BEADLESS |
| 2 | RESISTANCE | 0.033R | 805 |
| 3 | RESISTANCE | 10R | 603 |
| 4 | RESISTANCE | 220 | 603 |
| 5 | RESISTANCE | 100R | 603 |
| 6 | RESISTANCE | 1K | 603 |
| 7 | RESISTANCE | 4.7K | 603 |
| 8 | RESISTANCE | 10K | 603 |
| 9 | RESISTANCE | 22K | 603 |
| 10 | RESISTANCE | 47K | 603 |
| 11 | RESISTANCE | 100K | 603 |
| 12 | RESISTANCE | 1M | 603 |
| 13 | THERMISTOR | 103J (NTC) | 603 |
| 14 | CAPACITANCE | 103p | 603 |
| 15 | CAPACITANCE | 333p | 603 |
| 16 | CAPACITANCE | 104p | 603 |
| 17 | CAPACITANCE | 105p | 603 |
| 18 | CAPACITANCE | 226p X5R 6.3V | 805 |
| 19 | HIGH VOLTAGE CAPACITANCE | COG 473/50V | 1206 |
| 20 | HIGH VOLTAGE CAPACITANCE | COG 104/50V | 1206 |
| 21 | LIGHT EMITTING DIODE | RGB (RED, GREEN, BLUE), | 1615 |
| 22 | DIODE | 4148 | LL34 |
| 23 | STABILIVOLT IC | 7133 | SOT-23 |
| 24 | AUDION | 3904 | SOT-23 |
| 25 | AUDION | 3906 | SOT-23 |
| 26 | AUDION | 8050 | SOT-23 |
| 27 | MOS pipe P | CEM4953 | SOP8 |
| 28 | MOS pipe P | CEM9926 | SOP8 |
| 29 | OPERATIONAL AMPLIFIER | LM358 | SOP8 |
| 30 | MASTER CONTROL IC | BLANK | TSSOP20 |
| 31 | BUZZER | BUZZER | PASTER |
| 32 | ELECTRONIC MATERIAL SUBTOTAL | / | / |

Fig. 9 (cont'd)

| 33 | PCB MAIN BOARD | EVERY SMALL PCB | Φ52mm |
|---|---|---|---|
| 34 | LAMP PANEL | EVERY SMALL PCB | 25*4mm |
| 35 | DOUBLE FACED ADHESIVE TAPE | | Φ48mm |
| 36 | COIL | A5 OUTGOING LINE 10mm, MIDDLE LINE, UP LINE OUTGOING LINE, OUTLINE CLOCKWISE WIRE WRAPPING | 10 CIRCLE |
| 37 | SHIELD SHEET | / | Φ 50*1 |

SPILL PROOF ELECTRICAL CHARGER

BACKGROUND OF THE INVENTION

The present invention generally relates to spill-proof electrical chargers.

"Pop-up" charging devices, such as kitchen receptacles for charging electrical devices via a power cord, are known. A work surface of furniture, for example a table, includes an aperture through which the charging device moves. The charging device may be powered by a cord running below the work surface. The aperture may be covered by a decorative cover during non-use, when the charging device is "popped down" in a depressed condition. When the charging device is "popped-up" through the aperture and into an elevated position above the work surface, this exposes one or more electrical receptacles for receiving a power cord of an electrical device to be charged.

The present inventor is not aware of such charging devices offering wireless charging capabilities. It is difficult to design a charging device cover that overlies the aperture and surrounding work surface of a countertop, furniture or appliance in a flush, liquid-tight and aesthetic manner, as the coil wireless feature can be bulky.

It would be useful to provide a spill-proof electrical charger that can charge electrical devices either wirelessly or using a hard-wired approach. Electrical devices that can benefit from such an approach include personal digital assistants ("PDAs"), e.g., mobile/cellular telephones, hand-held computers and other electrical devices.

SUMMARY OF THE INVENTION

The objects mentioned above, as well as other objects, are solved by the present invention, which overcomes disadvantages of prior pop-up electrical chargers, while providing new advantages not previously associated with them.

In a preferred embodiment, a relocatable power tap moveable through an aperture of a work surface and functioning as an electrical charger for one or more electrical devices is provided. The power tap may be selectively moved through the aperture between depressed and upright positions. The power tap includes a charging station with one or more electrical receptacles for use in charging one or more of the electrical devices. The power tap has a top portion coupled to and located above the charging station, which top portion includes a wireless charging emitter and a cover. The cover preferably fits flush and liquid-tight with the work surface when the power tap is in the depressed position, while enabling the wireless charging emitter to be used as an electrical charger. Preferably, the charging station is located above the work surface in a spill-proof position, exposed for use as an electrical charger, when the power tap is in the upright position. At least one of the one or more electrical receptacles may include a GFCI outlet.

Definition of Claim Terms

The terms used in the claims of the patent are intended to have their broadest meaning consistent with the requirements of law. Where alternative meanings are possible, the broadest meaning is intended. All words used in the claims are intended to be used in the normal, customary usage of grammar and the English language.

"Spill-proof" means complying with the "Spill Test" set forth in Underwriters Laboratory (UL) 1363 (ISBN 0-7629-0073-3, § 34A, Oct. 24, 2001 rev.), concerning "Relocatable Power Taps" ("RPTs"), which are mounted on a desk or similar furnishing surface, i.e., opening the cover of the RPT, and pouring 8 ounces of saline solution toward the RPT, waiting 1 minute, and then subjecting the RPT to the Dielectric Voltage-Withstand Test set forth in UL 1363, § 35.

"Relocatable Power Tap" or "RPT" has the meaning set forth in UL 1363, Glossary, 3.3 (Apr. 23, 1997 rev.), inter alia, an attachment plug cap and a length of flexible cord terminating in an enclosure in which are mounted one or more receptacles.

"Work surface" includes any surface, as well as any aperture in such surface, for receiving a RPT, or that may be used to accommodate or support an RPT, including any surface associated with countertops, furniture, appliances, etc.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
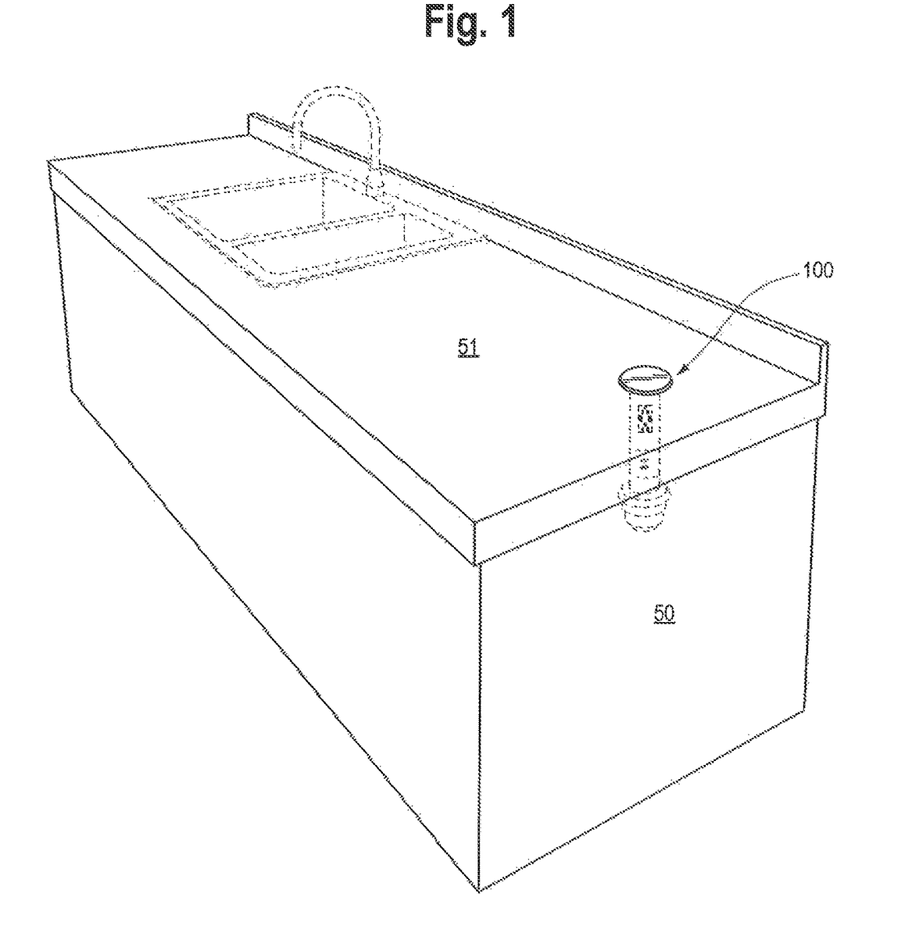
FIG. 1 is a top and side perspective view of a kitchen counter with a preferred embodiment of a spill-proof electrical charger of the present invention.
Figure 2:
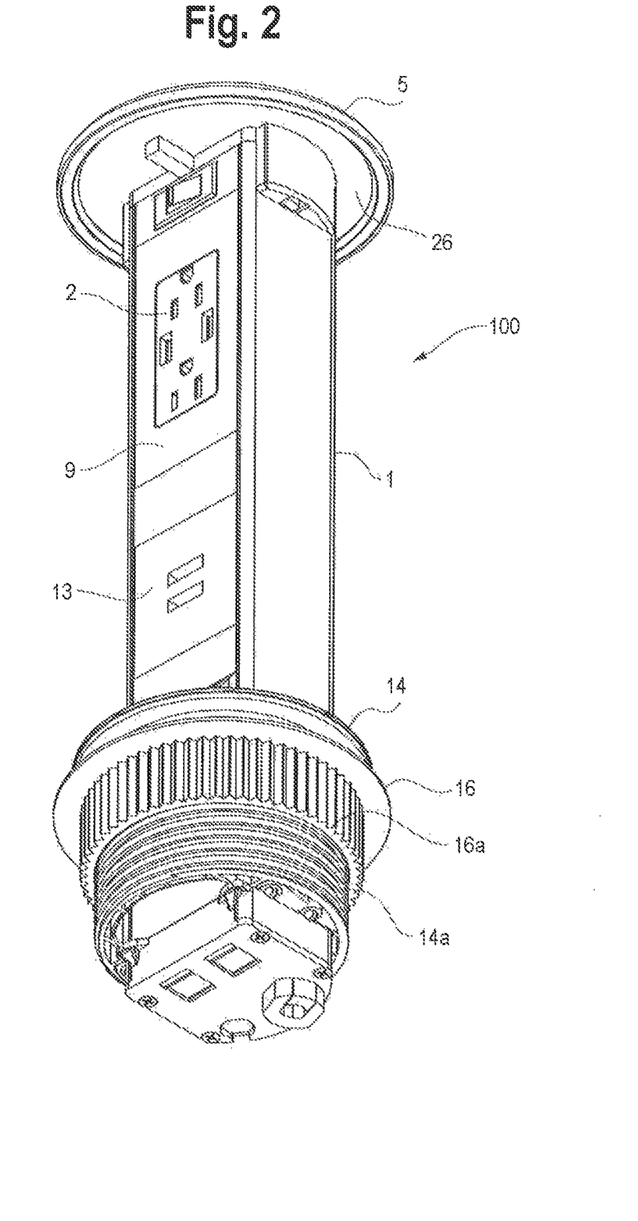
FIG. 2 is an enlarged bottom and side perspective view of the electrical charger shown in FIG. 1.
Figure 3:
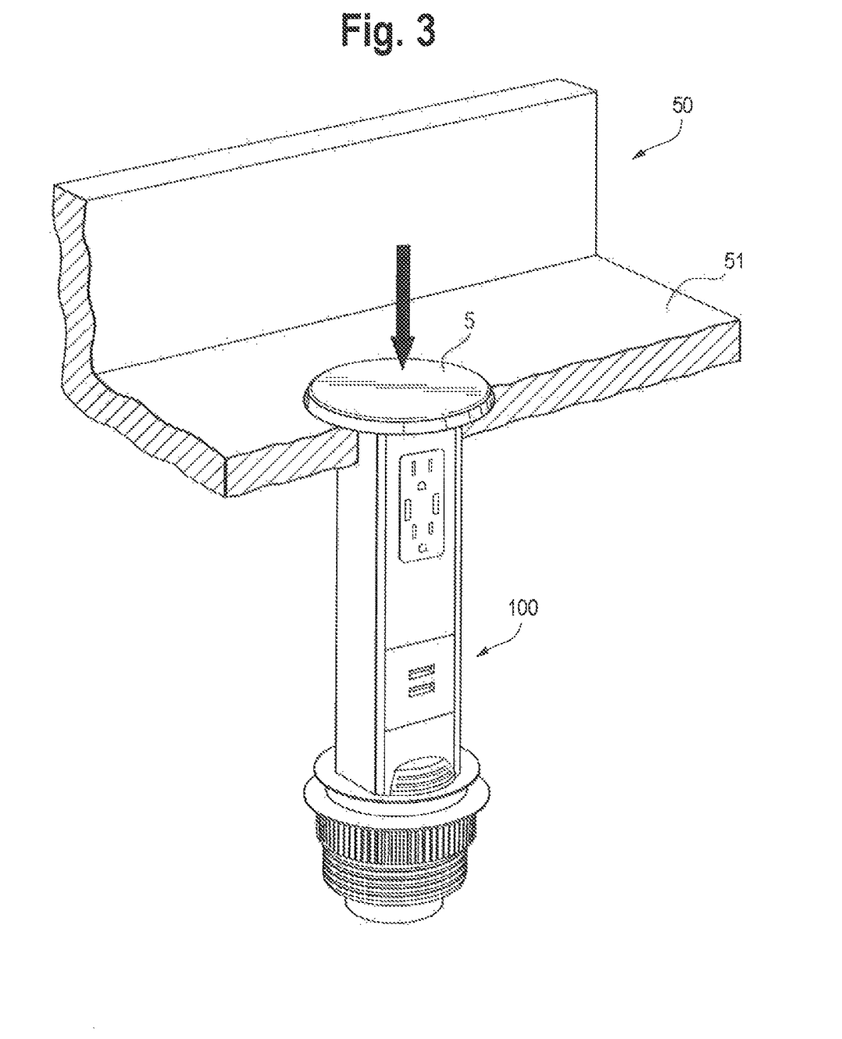
FIG. 3 is a perspective view of the electrical charger shown in a down or depressed position, relative to a work surface such as a countertop surface.
Figure 4:
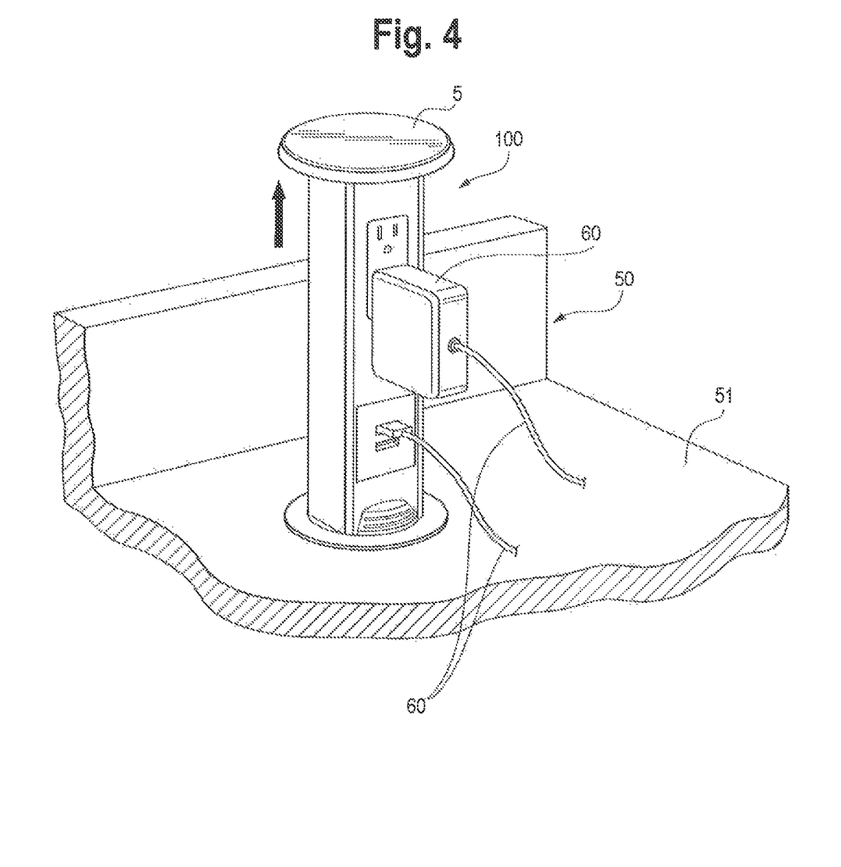
FIG. 4 is a view similar to FIG. 3 showing the electrical charger shown in an elevated position.

FIG. 1 shows a preferred embodiment of a pop-up receptacle electrical charger, generally designated by reference numeral 100, which preferably has both wireless and hard-wired charging capabilities, for use with various equipment or furniture, such as counter tops, tables, desks or other similar items having work surfaces which the charger can be attached to.

Figure 8:
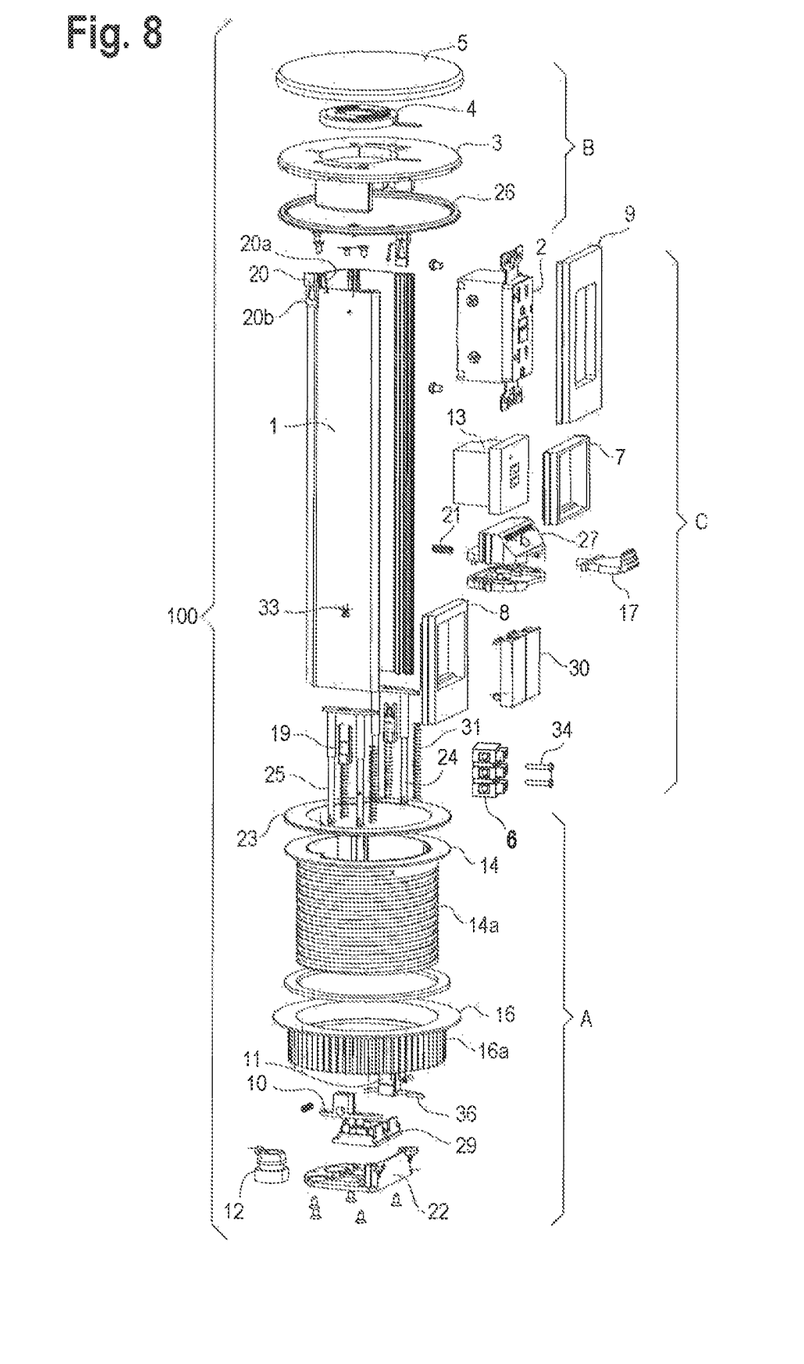
FIG. 8 is a perspective, parts view of the preferred embodiment of the electrical charger shown in FIG. 1.

Referring to FIG. 8, electrical charger/relocatable power tap (RPT) 100 may generally include a base portion A, a top portion B, and a charging station C located between these portions.

Still referring to FIG. 8, base portion A may include a fixing ring 16 with vertical threads 16a, allowing ring 16 to be threadably attached to a work surface. Base portion A may also include a fixing base 14 with external threads 14a, enabling base 14 to be threadably fastened to fixing ring 16, using interdisposed gasket 15 for waterproofing.

Figure 5:
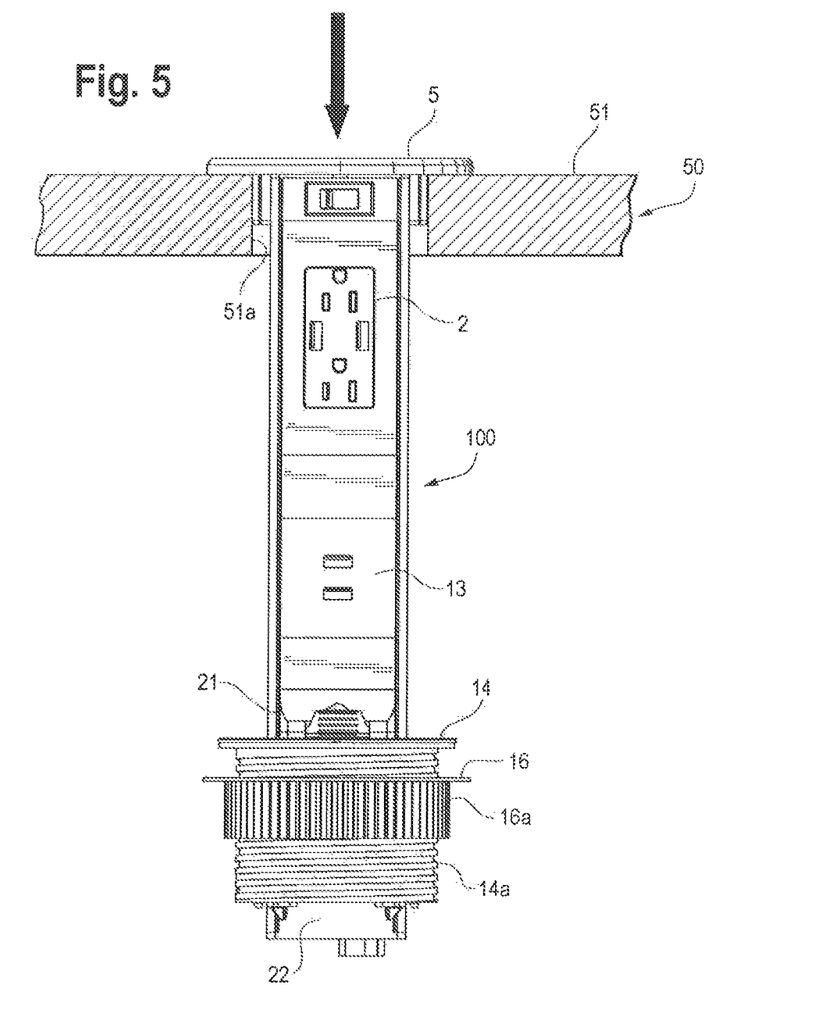
FIG. 5 is a side view, in partial cross-section, similar to FIG. 3.
Figure 6:
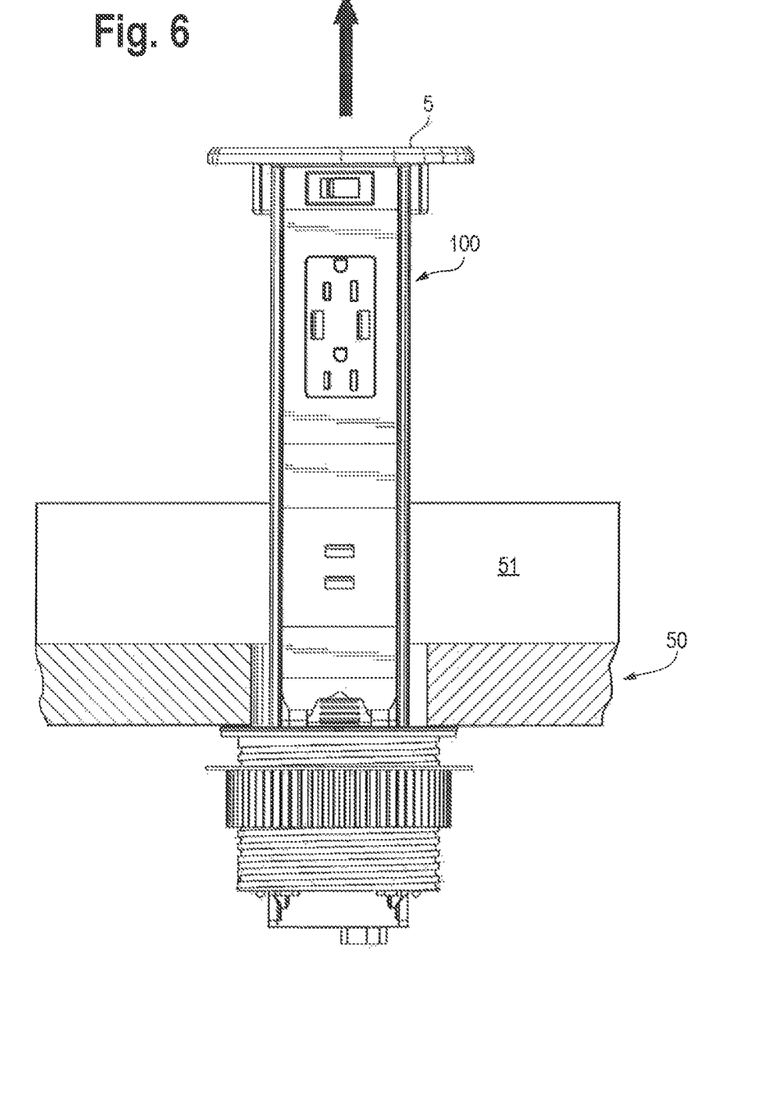
FIG. 6 is a side view, in partial cross-section, similar to FIG. 4.
Figure 7:
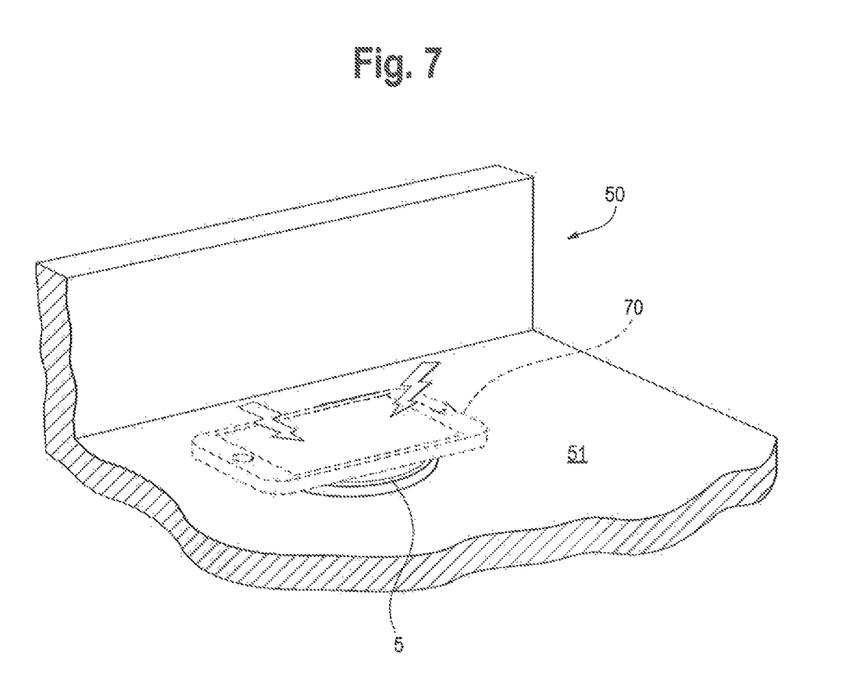
FIG. 7 is a top, perspective view of the charger in a depressed position, with an electrical device to be charged (a mobile phone) lying on top of the protective cover of the charger.

Data adapter 29 may be used if it is desired to add internet or phone (wired) to unit 100, and may be affixed to the bottom of ring 16 using column end cover 22. Friction plates 11 and 12, and cable tighten plate 12, are used to support prop-up spring 36. Decorative ring 23 may be used to enhance the aesthetics of the unit. When the unit is in the down position, rubber sealing gasket 26 may be pushed flush against the surrounding side of an aperture 51a of work surface 51 (e.g., FIG. 5), so that protective cover 5 provides a liquid-tight seal for wireless charging emitter coil 4, such that liquid cannot flow through the work surface aperture and into the bottom portion of the unit.

Charging station C may include case 1 carrying, e.g., a 20-amp GFI (encased by receptable adaptor 9), a 2USB charger 13 (encased by frame 7), and a terminal block 6 secured to the unit by fasteners 34. Terminal block 6 may be used for the connection of power cables from outside unit 100 with the cables inside unit 100; with this terminal block, when unit 100 is popped up or pushed down, the power cable inside will not be dragged or become loose.

Still referring to FIG. 8, locking mechanisms 17, 27, 28, and locking spring 21, may be used to lock unit 100 in its elevated position. When the unit is in its elevated, locked position, if a user pushes down on the top cover (perhaps inadvertently), the unit will not move. However, when column locking part 17 is first depressed, this depresses spring 21, allowing the unit to move down. Locking mechanisms 27, 28 house locking part 17, and fix spring 21 inside.

Module adaptor 8 and blank plate 30 may be used if it is desired to install another receptacle in this area, so that an extra power receptacle or communication data port may be provided when the unit is in a depressed position.

Now referring to FIG. 8, locking guide blocks 19 and prop-up spring 31, together with left and right spring plates 24, 25, constitute the pop-up mechanism for unit 100. Spring 20a moves within a triangular slot 20b of locking mechanism main part 20. Locking guide block 19 constitutes a housing to ensure that spring 20a only moves inside the slot of main part 20. When a user pushes down on the top cover 5, spring 20a moves to one side of triangular slot 20b of main part 20, allowing unit 100 to pop up; when a user pushes down on cover 5 again, spring 20a moves to another side of triangular slot 20b, and the top cover will be locked into a closed state.

Figure 9:
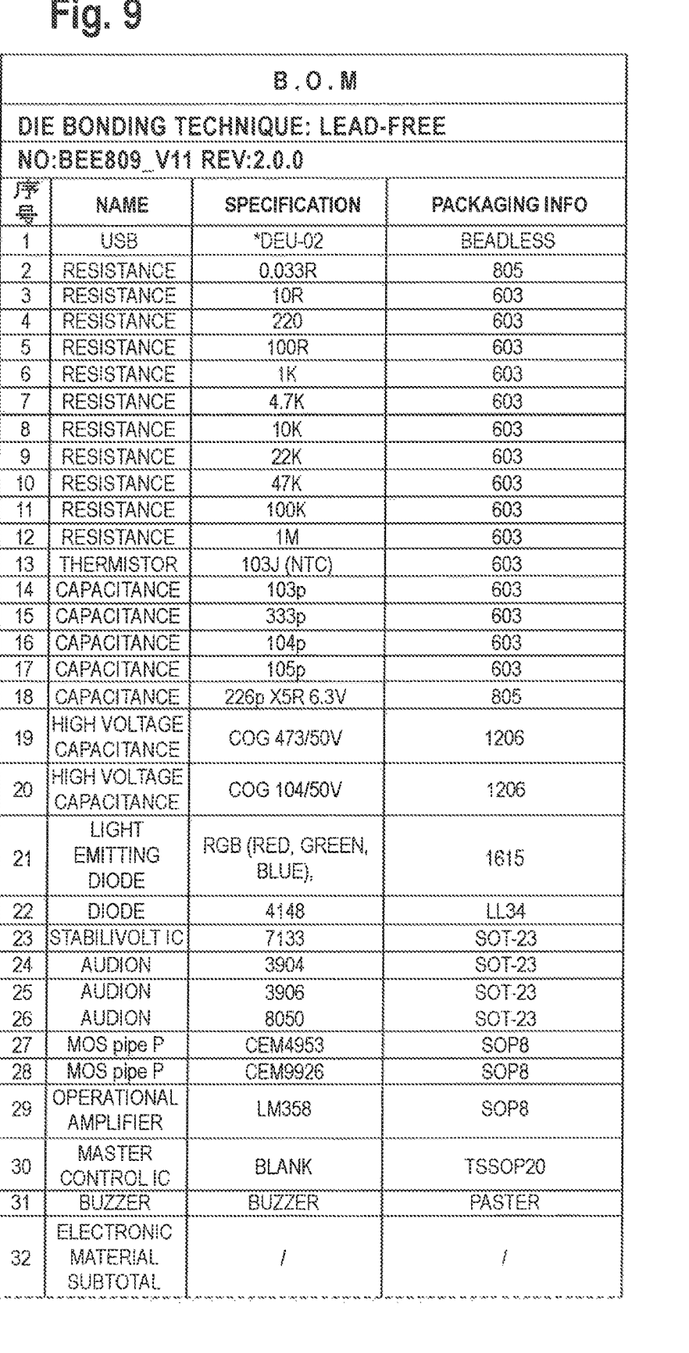
FIG. 9 is a parts list for the PCB board attached to the fixing base in the preferred embodiment.

Top portion B may include fixing base 14 fixably secured to a top portion of case 1, with top cover sealing gasket 26 interdisposed therein. Wireless charging emitter coil 4 may be mainly made of enameled copper wire, and may be carried by fixing base 3 accommodating a PCB board (see parts list for PCB board in FIG. 9), as shown. For this purpose, tab 4a of coil 4 may fit within corresponding tab aperture 14a of base 14.

In function, electrical charger 100 may be powered by a power cord (not shown) connected to charging station C; the power cord may be run down through base portion A and into an outlet (not shown). Whether charger is in a depressed or upright position, the wireless charger may be used by placing an electrical device to be powered on protective cover 5; the battery of the device to be powered will then electronically synchronize with emitter coil 4 for charging. When charger 100 is in an upright position, exposing charging station C above the work surface, electrical devices may be charged by hard-wire connection to GFI receptacles 2 or USB charger 9.

Here is a parts list for the preferred embodiment shown, summarizing the parts, and providing exemplary materials and quantities. The part numbers correspond to the reference numerals on the drawings:

| PARTS NO. | Parts Name | Description and/or Material | Quantity |
|---|---|---|---|
| 1 | aluminum case | Locking mechanism main part | 1 |
| 2 | 20A GFI | PC, ABS, copper, etc. | 1 |
| 3 | wireless charging emitter fixing base | PC | 1 |
| 4 | wireless charging emitter coil | enameled copper wire | 1 |
| 5 | wireless charging emitter protective cover | ABS | 1 |
| 6 | terminal block | PC | 1 |
| 7 | PUR (pop-up receptacle) single type 45 frame | PC | 1 |
| 8 | type 45 size module adaptor | silicon | 1 |
| 9 | US type receptacle adaptor | PC | 1 |
| 10 | left-side friction plate | PC | 1 |
| 11 | right-side friction plate | PC | 1 |
| 12 | cable tighten clip | ABS | 1 |
| 13 | type 45 2 USB charger | PC and others | 1 |
| 14 | PUR fixing base | PC | 1 |
| 15 | Gasket | butadiene-acrylonitrile rubber | 1 |
| 16 | PUR fixing ring | PC | 1 |
| 17 | column-locking part | PC | 1 |
| 18 | locking spring | prop-up spring | 2 |
| 19 | locking guide block | stainless steel | 2 |
| 20 | locking mechanism main part | locking mechanism main part | 2 |
| 21 | locking spring | locking spring | 1 |
| 22 | column end cover | PC | 1 |
| 23 | down decorative ring | SS304 | 1 |
| 24 | right-side spring plate | PC | 1 |
| 25 | left-side spring plate | PC | 1 |
| 26 | top cover sealing gasket | soft silicone | 1 |
| 27 | Upper locking mechanism part | PC | 1 |
| 28 | down locking mechanism part | PC | 1 |
| 29 | data adaptor | PC | 2 |
| 30 | blank plate | PC | 2 |
| 31 | prop-up spring | locking spring | 4 |
| 32 | GB (standard Chinese) wood screws (type 135, 3.5X8-C) | | 10 |
| 33 | cross-recessed countersunk head screws GB2 | | 2 |
| 34 | GB cross-screws (type 1 M3X16-16, H Type-N) | | 2 |
| 35 | GB cross-screws (type 2 M4X5-5, H Type-N) | | 2 |
| 36 | friction prop-up spring | locking spring | 2 |
| 37 | GB cross screws (Type M3X5-3.35, H Type-C) | | 5 |

Preferably, wireless charging emitter 4 is in the shape of a round coil. It will also be understood that GFI receptacle 2 or USB charger 13 may also include a ground fault circuit interrupter (GFCI)-type outlet to prevent electrical shock in wet locations.

The above description is not intended to limit the meaning of the words used in the following claims that define the invention. Persons of ordinary skill in the art will understand that a variety of other designs still falling within the scope of the following claims may be envisioned and used. It is contemplated that these additional examples, as well as future modifications in structure, function, or result to that disclosed here, will exist that are not substantial changes to what is claimed here, and that all such insubstantial changes in what is claimed are intended to be covered by the claims.

I claim:

1. A relocatable power tap moveable within an aperture of a work surface and functioning as an electrical charger for one or more electrical devices, wherein the power tap may be selectively moved within the aperture between depressed and upright positions, comprising:
- a charging station including one or more electrical receptacles for use in charging one or more of the electrical devices; and
- a top portion coupled to and located above the charging station, the top portion including a wireless charging emitter and a cover;
- wherein when the power tap is in the depressed position, the cover is in and liquid-tight with the work surface while enabling the wireless charging emitter to be used as an electrical charger, and wherein when the power tap is in the upright position, the charging station is located above the work surface in a spill-proof position, and exposed for use as an electrical charger.

2. The relocatable power tap of claim 1, wherein at least one of the one or more electrical receptacles includes a GFCI outlet.

* * * * *

UNITED STATES PATENT AND TRADEMARK OFFICE
CERTIFICATE OF CORRECTION

PATENT NO. : 10,084,337 B1  
APPLICATION NO. : 15/492816  
DATED : September 25, 2018  
INVENTOR(S) : Cozzi Page 1 of 1

It is certified that error appears in the above-identified patent and that said Letters Patent is hereby corrected as shown below:

In the Claims

Line 22 of Claim 1: after is "in and" should be deleted.

Signed and Sealed this  
Third Day of September, 2019

Andrei Iancu  
*Director of the United States Patent and Trademark Office*